Feb. 15, 1927.
R. LITTLEFIELD
CART STRUCTURE
Filed April 2, 1923
1,617,644
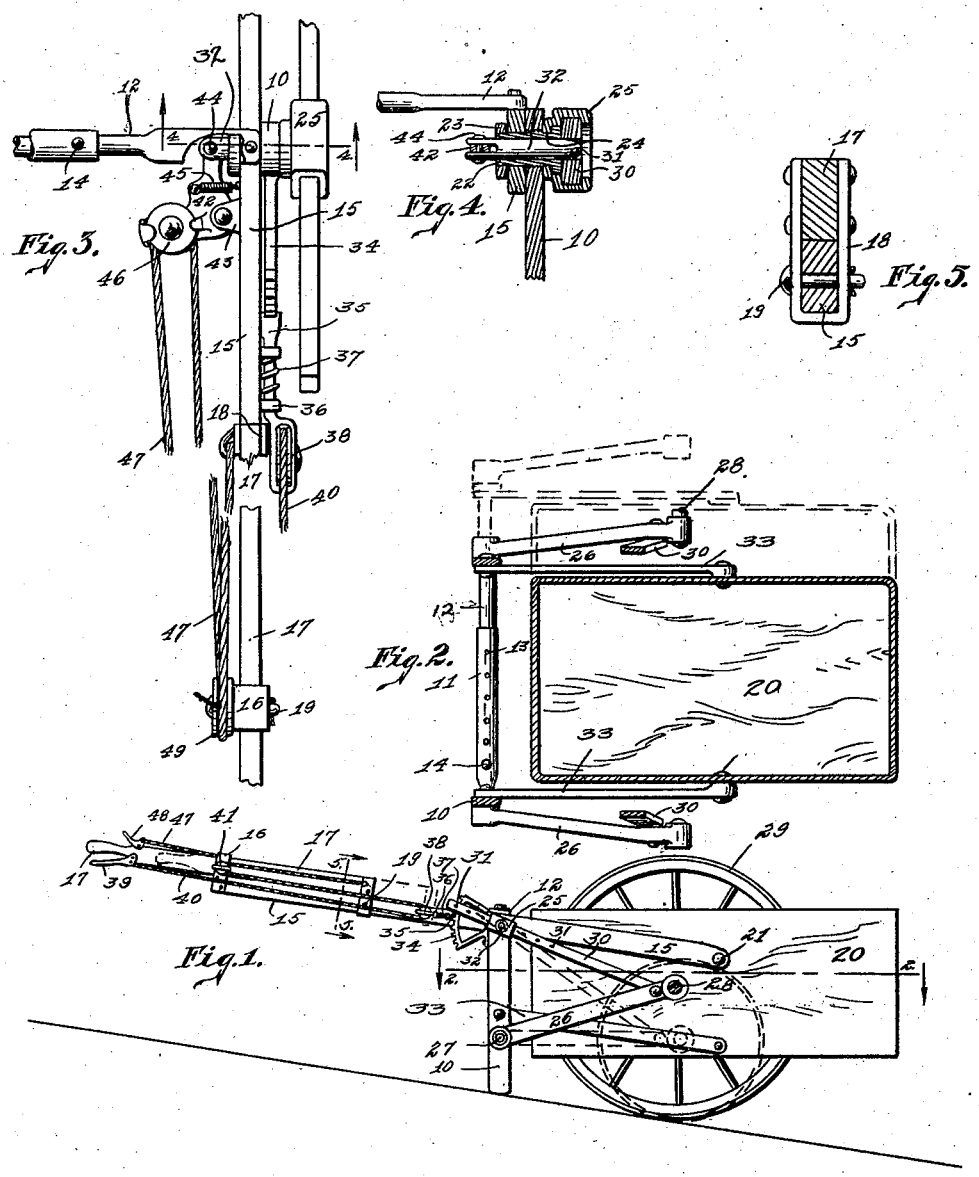
Inventor
Roy Littlefield
by Bair & Freeman Attys.
Witness
Lynn Latta Patented Feb. 15, 1927.

1,617,644

UNITED STATES PATENT OFFICE.

ROY LITTLEFIELD, OF EXIRA, IOWA.

CART STRUCTURE.

Application filed April 2, 1923. Serial No. 629,370.

The object of my invention is to provide a cart structure of simple, durable and comparatively inexpensive construction.

More particularly, my invention relates to a cart structure wherein the cart body may be mounted in a horizontal position regardless of the inclined surface upon which the cart structure may rest.

Still another object is to provide a structure wherein the position of the wheels relative to the remainder of the cart structure may be secured for maintaining the cart body in a horizontal position.

Still a further object is to provide a structure wherein the hand engaging elements may be extended when desired.

Still a further object is to provide controlling devices which regulate the position of the wheels relative to the remainder of the frame at the ends of the levers.

My invention relates to an improvement in my Letters Patent issued to me on March 20, 1923, No. 1,449,011.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my cart structure.

Figure 2 is a sectional view taken on line 2—2 of Figure 1, the dotted line position showing the parts extended.

Figure 3 is an enlarged, detail view of one of the levers and control devices.

Figure 4 is a detail, sectional view taken on line 4—4 of Figure 3; and

Figure 5 is a sectional view taken on line 5—5 of Figure 1.

In the accompanying drawings, I have used the reference numeral 10 to indicate generally a pair of uprights which are spaced apart by a pair of telescoping cross pieces 11 and 12. The telescoping cross pieces 11 and 12 are provided with openings 13 into which may be extended a pin 14 for locking them in any desired position.

Pivotally secured to each of the uprights 10 is the lever 15. The levers 15 are provided with yoke members 16 at their rear ends, in which are slidably mounted the hand engaging members 17. Secured to the hand engaging members 17, at their forward ends are yokes 18 similar to the yoke 16.

From the construction of the parts just described, it will be seen that the hand engaging member 17 may be slid relative to the levers 15. The hand engaging member 17 may be locked relative to the levers 15 by means of a pin or the like 19 extended through the yoke 18 and the lever 15.

Secured to the forward ends of the levers 15 is a cart body 20. The cart body is pivotally connected to the forward ends of the levers 15 by means of the bolts 21.

A sleeve 22 extends through the uprights 10 and through the lever 15, as clearly shown in Figure 4 of the drawings. The sleeve 22 is provided with a screw threaded portion on its inner end and has a nut 23 secured thereto.

The outer end of the sleeve 22 is provided with an annular groove 24. Rotatably mounted upon the sleeve 22 and within the groove 24 is a socket member 25. The purpose of the socket member 25 will be hereinafter more fully set forth.

A link 26 is pivoted to the upright 10 by means of the pivot 27. The forward end of the link forms a bearing for a stub shaft 28 upon which may be journalled the wheel 29.

A link 30 is pivoted to the forward end of the link 26 and has its other end slid through the socket 25. The link 30 is provided with a plurality of openings 31 into which may be extended the locking pin 32.

The locking pin 32 is mounted in the sleeve 22 and when an opening 31 is in register with the opening in the sleeve, the locking pin 32 may be placed in position. The upright 10, the links 26 and 30, when connected together form a triangular shaped frame member.

A lever 33 is pivotally connected to the uprights 10 at one end and to the cart body at its other end. The levers 15 and 33 operate in unison with each other.

When the lever 15 is swung on its pivot, it causes the cart body to be raised or lowered retaining it, however, in a horizontal position at all times. The horizontal position of the cart body 20 is obtained by virtue of the parallelogram arrangement of the members 15, 33, 10, and the cart body.

The cart body will always remain in a position where its upper surface will be at substantially right angles to the support 10, and for that reason, it is desirable to maintain the support 10 in a vertical position wherein the cart body will be maintained in a horizontal position. In order to lock the lever 15 against movement, relative to the support 10, I provide a notched sector 34 on the upright 10.

A locking pawl 35 is slidably mounted in a pair of bearings 36 on the lever 15. A spring 37 arranged between the bearings 36 and on the pawl 35 tends to hold the pawl in engagement with the sector 34.

A pulley wheel 38 is mounted on the pawl 35, the purpose of which will be hereafter more fully set forth.

A hand engaging latch 39 is pivoted on the member 17 and has a flexible element 40 secured thereto. The flexible element 40 extends forwardly and around the pulley wheel 38. The flexible element then extends rearwardly and around a pulley wheel 41 which is mounted on the yoke 16.

The flexible element then extends forwardly and is fixed to the yoke member 18. The engaging of the latch 39 will cause the pawl to be withdrawn from the sector 34.

When the member 17 is extended relative to the lever 15, it will cause the flexible element 40 to remain taut at all times, that is, the closer the yoke members 16 and 18, the farther in equal proportion the pulley 41 will be from the pulley 38. The arrangement of the pulley wheels and the flexible element makes it possible to extend the member 17 relative to the lever 15 without interference with the pawl 35.

From the construction of the parts just described, it will be seen that the levers 15 may be moved and locked in any desired position. From the construction of the parts just described, it will be seen that the cart body may be raised or lowered and yet maintained in a horizontal plane.

In order to operate the locking pin 32, I provide a casting 42 which is pivoted to a lug 43 on the lever 15. One end of the casting 42 is connected to the locking pin 32 by means of the rivet 44.

A coil spring 45 is secured at one end to the casting 42 and at its other end to the lever 15 for normally holding the locking pin 32 in operative position.

A pulley wheel 46 is mounted on the casting 42 and has the flexible element 47 extended therearound. One end of the flexible element 47 is secured to the yoke member 18 and the other end is secured to a latch control 48.

A pulley wheel 49 is fixed to the yoke member 16 and has the flexible element extended therearound.

The arrangement of the flexible element 47 is very much similar to the flexible element 40 wherein the member 17 may be extended relative to the lever 15.

When it is desired to withdraw the locking pin 32 from the link 30, the latch 48 is engaged, thus moving the casting 42 on its pivot against the action of the coil spring 45.

The link 30 is disengaged from the locking pin 32 when it is desired to change the position of the wheels of the device relative to the remainder of the device. The position of the link 30 may be changed so that it assumes the position shown in dotted lines in Figure 1, wherein a small wheel (shown in dotted lines) may be used.

The structure is preferably designed to be used upon an inclined surface and, for that reason, it is necessary for the bottom of the wheel and the bottom of the upright member 10 to rest in different horizontal planes.

In order to retain the vertical position of the upright 10 and thus retain the horizontal position of the cart body, when the bottom of the upright 10 is above or below the bottom of the wheel 29, the angular relation of the members 26, 30, and 10 may be changed allowing the brace 30 to shift relative to the socket 25. Thus the angle between the upright 10 and the levers 15 may be changed.

It will be seen that the position of the wheels relative to the upright 10 may be had by disengaging the locking pin 32 and sliding the link 30 within the socket member 25. The cart body itself may be raised or lowered by shifting the position of the lever 15.

The providing of the telescoping members 12 and 13 enables me to use the cart bodies of various widths, as shown in dotted lines in Figure 2 of the drawings.

It will be seen that I have provided a very efficient cart structure for maintaining the cart body in a proper horizontal position regardless of the angle of inclination of the surface upon which the structure is used.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In a device of the class described, wheel mounted triangular frames, two pairs of levers capable of pivotal movement about horizontal axes and adapted to operate in unison, hand engaging members on one pair of said levers, means controllable at said hand engaging members for locking said levers in any of their positions, means for varying the position of the pivotal axes of said levers relative to the wheels, said last means comprising a slidable connection for one side of said triangular frames for varying the angles of the triangular frames as specified.

2. In a device of the class described, wheel mounted triangular frames including supports arranged to be held in a vertical plane, and pairs of links pivoted thereto and to each other, two pairs of levers pivoted to said supports, a cart body mounted on said levers and arranged to be maintained in a predetermined relation to said supports, the wheels being journalled to said frames, means controlled from the ends of two of said levers for varying the position of said cart body relative to said supports depending upon the inclined surface upon which said device is set as and for the purposes stated.

3. In a device of the class described, wheel mounted triangular frames, two pairs of levers capable of pivotal movement about horizontal axes and adapted to operate in unison, one pair of said levers being extensible and having hand engaging members thereon, means controllable at said hand engaging members for locking said levers in any of their positions, means for varying the triangular frames relative to the wheels, said last means comprising a sliding connection for one side of said triangular frames, for varying the angles thereof, said extensible pair of levers being so constructed that their extension or contraction will not affect said lever locking means.

4. In a wheel mounted structure of the class described, triangular supporting frames, each triangular frame comprising a support, a link pivoted thereto on which a wheel is rotatably mounted, a second link pivoted to said first link, said second link being slidably secured to said support, whereby the position of the entire device relative to the wheel may be varied, two pairs of levers capable of pivotal movement about horizontal axes and adapted to operate in unison, a cart body mounted on the forward ends of said levers, the axes for said levers being mounted on said supports, said levers, cart body and supports forming substantially parallelograms for maintaining the cart body in a predetermined relation to said supports, hand engaging members on one pair of said levers, means controllable at the hand engaging members of said pair of levers, whereby the cart body may be raised and locked in any of its positions.

Des Moines, Iowa, March 26, 1923.

ROY LITTLEFIELD.